United States Patent
Doneva et al.

(10) Patent No.: US 9,115,620 B2
(45) Date of Patent: Aug. 25, 2015

(54) CROSS-LINKABLE POLYOLEFIN COMPOSITION FOR FORMED TEXTURED SKIN APPLICATIONS

(75) Inventors: Teodora Doneva, Horgen (CH); Stephen H. Cree, Hirzel (CH)

(73) Assignee: Dow Global Technologies LLC, Midland, MI (US)

( * ) Notice: Subject to any disclaimer, the term of this patent is extended or adjusted under 35 U.S.C. 154(b) by 1 day.

(21) Appl. No.: 13/977,117

(22) PCT Filed: Feb. 1, 2012

(86) PCT No.: PCT/US2012/023442
§ 371 (c)(1),
(2), (4) Date: Jun. 28, 2013

(87) PCT Pub. No.: WO2012/106401
PCT Pub. Date: Aug. 9, 2012

(65) Prior Publication Data
US 2014/0041365 A1 Feb. 13, 2014

Related U.S. Application Data

(60) Provisional application No. 61/439,492, filed on Feb. 4, 2011.

(51) Int. Cl.
| | |
|---|---|
| *C08L 23/08* | (2006.01) |
| *B32B 1/00* | (2006.01) |
| *F01N 3/08* | (2006.01) |
| *C08L 51/06* | (2006.01) |
| *B29C 69/00* | (2006.01) |
| *C08J 5/18* | (2006.01) |
| *B29C 37/00* | (2006.01) |
| *B29C 47/00* | (2006.01) |
| *B29C 51/10* | (2006.01) |
| *B29K 101/10* | (2006.01) |
| *B29K 301/10* | (2006.01) |
| *B29L 31/30* | (2006.01) |

(52) U.S. Cl.
CPC .............. *F01N 3/08* (2013.01); *B29C 47/0021* (2013.01); *B29C 69/00* (2013.01); *C08J 5/18* (2013.01); *C08L 23/08* (2013.01); *C08L 51/06* (2013.01); *B29C 37/0053* (2013.01); *B29C 47/0004* (2013.01); *B29C 51/10* (2013.01); *B29C 2791/006* (2013.01); *B29C 2791/007* (2013.01); *B29K 2101/10* (2013.01); *B29K 2301/10* (2013.01); *B29L 2031/30* (2013.01); *C08J 2343/04* (2013.01); *C08J 2351/06* (2013.01); *C08J 2423/08* (2013.01); *C08J 2423/16* (2013.01); *Y10T 428/1352* (2015.01); *Y10T 428/24479* (2015.01)

(58) Field of Classification Search
CPC ............ C08L 23/08; C08L 51/06; C08J 5/18; B29C 47/0021; Y10T 428/1352; Y10T 428/24479
USPC ......... 428/34.4–35.5, 35.7–35.9, 36.4–36.92, 428/156, 172; 264/241
See application file for complete search history.

(56) References Cited

U.S. PATENT DOCUMENTS

2007/0027250 A1* 2/2007 Joseph et al. ................. 524/515

* cited by examiner

*Primary Examiner* — Walter B Aughenbaugh

(57) ABSTRACT

The present invention relates to a flexible polyolefin composition, a sheet made therefrom, and a formed textured skin for applications such as interior furnishings of an automobile and a process to make such composition, sheet, and textured skin. Specifically said composition comprises an extrudable cross-linkable polyolefin composition comprising: (i) from 60 to 75 weight percent of one or more one silane cross-linkable polyolefin polymer; (ii) a moisture-cure condensation catalyst; and (iii) from 25 to 40 weight percent of one or more polyolefin polymer elastomer. Preferably an extruded sheet of said composition is formed into a textured skin, preferably by positive vacuum forming.

8 Claims, No Drawings

CROSS-LINKABLE POLYOLEFIN COMPOSITION FOR FORMED TEXTURED SKIN APPLICATIONS

FIELD OF THE INVENTION

The present invention relates to a flexible polyolefin composition, a sheet made therefrom, and a formed textured skin for interior furnishings of an automobile and a process to make such composition, sheet, and textured skin.

BACKGROUND OF THE INVENTION

Textured skin sheets for internal automotive furnishings, such as instrument panels, door trim and so on, were made principally of soft polyvinyl chloride resin (PVC). In recent years, however, olefinic thermoplastic elastomers have been used. Textured skins of olefinic thermoplastic elastomers may be produced by a number of techniques including positive and negative vacuum forming. Positive vacuum forming is carried out using a non-grained forming mold having perforations for evacuating the interface between the mold surface and the textured skin sheet (texture is formed on the outer face of an extruded sheet by embossing prior to vacuum forming) inside face by placing the texture or grain sheet on the mold with its textured outer face being exposed to the exterior and pressing the sheet onto the mold face by evacuating the space beneath the sheet. Therefore, the patterns of the textured outer face of the textured sheet may be apt to undergo deformation during the process of forming. In particular, a textured skin made of an olefinic thermoplastic elastomer may suffer from such deformation of the pattern upon a vacuum forming, especially upon positive vacuum forming, more easily as compared with that made of soft PVC, resulting in an inferior ability for retaining the texture.

Attempts to improve grain retention in olefin thermoplastic elastomers include, for example, peroxide treatment of polyolefin elastomer rich polypropylene blends subjected to dynamic heat treatment to increase blend viscosity and lower flexural modulus, thus promoting grain retention. For example, see U.S. Pat. Nos. 4,861,834; 5,218,046; 5,852,100; 6,100,335; 6,500,900; and 6,565,986. However, this approach involves reactive extrusion of the polyolefin elastomer blend and is difficult to control the degree of radical reactions. Thermoforming may also be impaired due to the elastomer cross-linking.

An alternative approach for polyolefin elastomer rich blends has involved electron beam cure. For example, see U.S. Pat. No. 7,534,318. This approach generally improves grain retention, but is limited to producers with access to expensive e-beam technology and is a rather expensive solution to the problem.

There is still a need for an improved cross-linkable polyolefin composition and simple process which provides improved grain retention when a sheet of said composition is thermoformed/vacuum formed into a textured skin.

SUMMARY OF THE INVENTION

The present invention is such a cross-linkable polyolefin composition and process to vacuum form an extruded textured sheet into a textured skin with improved grain retention. In one embodiment, the present invention is a process to form a cross-linkable polyolefin composition into a textured skin comprising the steps of: (a) forming an extrudable cross-linkable polyolefin composition comprising: (a.i) an amount of from 60 to 75 weight percent of one or more one silane cross-linkable polyolefin polymer, weight percent based on the total weight of the cross-linkable polyolefin composition; (a.ii) a moisture-cure condensation catalyst; and (a.iii) an amount of from 25 to 40 weight percent of one or more polyolefin polymer elastomer, weight percent based on the total weight of the cross-linkable polyolefin composition, wherein the polyolefin polymer elastomer resin has a density of less than or equal to about 0.89 g/cm$^3$ and a melt index, $I_2$, of less than about 50 g/10 min and which has been prepared using at least one metallocene catalyst; (b) extruding said extrudable cross-linkable polyolefin composition into a sheet comprising the cross-linkable composition, said sheet having a first surface and a second surface; (c) imparting a texture into the first surface of the sheet prior to or during step (d); and (d) thermoforming or vacuum forming the sheet into a textured skin comprising a cross-linkable composition, said skin having an inside surface and an outside surface (or appearance surface) such that the textured surface of the textured sheet is the appearance surface of the textured skin.

In one embodiment, the present invention is the process described herein above wherein the silane cross-linkable polyolefin polymer is a copolymer of ethylene with a vinyl silane comonomer.

In another embodiment of the process of the present invention described herein above the silane cross-linkable polyolefin polymer is a copolymer of ethylene-vinyltrimethoxysilane.

In another embodiment of the process of the present invention described herein above, the polyolefin polymer elastomer has a density of equal to or less than 0.885 g/cm$^3$.

In another embodiment of the process of the present invention described herein above, the polyolefin polymer elastomer resin has a melt index, $I_2$, of between about 1 to 40 g/10 min.

Another embodiment of the present invention is a thermoformed or vacuum formed textured skin made from a composition comprising: (a) an extrudable cross-linkable polyolefin composition comprising: (a.i) an amount of from 60 to 75 weight percent of one or more one silane cross-linkable polyolefin polymer, weight percent based on the total weight of the cross-linkable polyolefin composition; (a.ii) a moisture-cure condensation catalyst; and (a.iii) an amount of from 25 to 40 weight percent of one or more polyolefin polymer elastomer, weight percent based on the total weight of the cross-linkable polyolefin composition, wherein the polyolefin polymer elastomer resin has a density of less than or equal to about 0.89 g/cm$^3$ and a melt index, $I_2$, of less than about 50 g/10 min and which has been prepared using at least one metallocene catalyst.

In another embodiment of the present invention, the textured skin described herein above is used as a covering material in an automotive product, a sporting goods product, a housing product, a building product, a furniture product, an industrial product, a bag, a briefcases, a toy, or an outer frame of picture or photograph.

In yet another embodiment of the present invention, the textured skin described herein above is used as a covering material in an automobile product such as an instrument panel, a console box, an arm rest, a head rest, a door trim, a rear panel, a pillar trim, a sun visor, a trunk room trim, a trunk lid trim, an air bag cover, a seat buckle, a head liner, a gloves box, a steering wheel, a kicking plate, a change lever boot, a spoiler, a side mole, a number plate housing, a mirror housing, an air dam skirt, or a mud guard.

DETAILED DESCRIPTION OF THE INVENTION

The cross-linkable polyolefin composition of the present invention comprises a silane cross-linkable polyolefin polymer (i) which may be cured by contact with, or exposure to, water (moisture), preferably in the presence of a condensation catalyst. Such polymers are made either by polymerization with a vinyl silane monomer or by one of many methods for grafting a silane-containing molecule to the backbone of a polymer chain. Examples of such techniques are disclosed in U.S. Pat. No. 3,646,155; 6,420,485; 6,331,597; 3,225,018; or 4,574,133, and US Publication No. 2010/0181092, which are all incorporated herein by reference in their entirety. A preferred silane cross-linkable polyolefin polymer is a copolymer of ethylene with a vinyl silane comonomer. Another preferred silane cross-linkable polyolefin polymer is an ethylene-vinyltrimethoxysilane copolymer. Such polymers are commercially available, for example, Si-LINK™ ethylene-vinyltrimethoxysilane copolymers available from Dow Chemical Co. or VISICO™ polymers from Borealis.

The silane-functionalized polyolefin polymer (i) is present in an amount equal to or less than 80 weight percent based on the total weight of the cross-linkable polyolefin composition, preferably equal to or less than 75 weight percent, more preferably equal to or less than 72 weight percent based on the total weight of the cross-linkable polyolefin composition. The silane-functionalized polyolefin polymer (i) is present in an amount greater than 60 weight percent based on the total weight of the cross-linkable polyolefin composition, preferably equal to or greater than 65 weight percent, more preferably equal to or greater than 66 weight percent based on the total weight of the cross-linkable polyolefin composition.

The silane-functionalized polyolefin polymers (i) usable in the present invention may be cured by contact with, or exposure to, water (moisture), preferably in the presence of a catalyst (ii) (also called moisture-cure condensation catalyst herein). Suitable catalysts include metal carboxylates, such as dibutyltin dilaurate, stannous octoate, stannous acetate, lead naphthenate and zinc octoate; organic metal compounds, such as titanium esters and chelates such as tetrabutyl titanate; organic bases, such as ethylamine, hexylamine and piperidine; and acids, such as mineral acids and fatty acids. Ambient or accelerated cure systems typically use fast acting condensation catalysts, such as aromatic sulphonic acids. Preferred catalysts are organic tin compounds such as dibutyltin dilaurate, dibutyl dimethoxy tin, dibutyltin bis(2,4-pentanedionate), stannous octoate, and aromatic sulphonic acids. Such moisture-cure condensation catalysts and catalyst systems are readily commercially available. Examples of suitable commercial catalysts in masterbatch form include, without limitation, DFDB 5480NT (a tin catalyst system), DFDA 5488NT (a fast ambient cure catalyst masterbatch) from DOW Plastics, or the Borealis AMBICAT™ system LE 4476.

The amount of moisture-cure condensation catalyst (ii) sufficient to cure the silane-functionalized polyolefin polymer (i) will generally depend on the specific type selected but will preferably range from about 0.01 to 0.1 parts by weight per 100 parts by weight of the silane polymer. If added in the form of a commercial polymer masterbatch as above the catalyst masterbatch is added in the ratio 5 parts to 95 parts of silane copolymer.

The silane-functionalized polyolefin polymers (i) and catalyst (ii) of the present invention are further blended with one or more low density metallocene polyolefin elastomer (iii), prior to moisture curing. Moisture curing is discussed in more detail herein below, but is initiated by exposure to, water (moisture). The silane-functionalized polyolefin polymers (i), catalyst (ii), and one or more low density metallocene polyolefin elastomer (iii), are blended in a particular combination which leads to the cross-linkable polyolefin composition of the present invention. Typically, the polyolefin elastomers (iii) are ethylene copolymers. These polyolefin elastomers should have a density of less than or equal to about 0.89 g/cm$^3$, more preferably less than or equal to about 0.885 g/cm$^3$. All polymer density values in the specification and claims are as measured by ASTM D-792. Preferably, the polyolefin elastomers have a melt index, $I_2$, of less than about 50 g/10 min, more preferably between 1 and 40 g/10 min, and more preferably, of between 1 to 30 g/10 min. Unless otherwise specified, all melt indexes in the specification and claims are as measured according to ASTM D-1238, Condition 190° C./2.16 kg.

The polyolefin elastomer (iii) is present in an amount equal to or greater than 20 weight percent based on the total weight of the cross-linkable polyolefin composition, preferably equal to or greater than 25 weight percent, more preferably equal to or greater than 26 weight percent based on the total weight of the cross-linkable polyolefin composition. The polyolefin elastomer (iii) is present in an amount less than 40 weight percent based on the total weight of the cross-linkable polyolefin composition, more preferably equal to or less than 35 weight percent, more preferably equal to or less than 30 weight percent based on the total weight of the cross-linkable polyolefin composition.

The polyolefin elastomers (iii) are prepared with at least one metallocene catalyst. The elastomer resin may also be prepared with more than one metallocene catalyst or may be a blend of multiple elastomer resins prepared with different metallocene catalysts. In some embodiments, the elastomer is a substantially linear ethylene polymer or a linear ethylene polymer (S/LEP). S/LEP elastomers and other metallocene catalyzed elastomers are known in the art, see for example, U.S. Pat. No. 5,272,236 incorporated herein by reference in its entirety. These elastomer resins are also commercially available, for example, SLEP elastomers as ENGAGE™ Elastomer Resins available from The Dow Chemical Company or LEP elastomers as EXACT™ polymers from Exxon or TAFMER™ polymers from Mitsui Chemicals.

In some embodiments, the polyolefin elastomer (iii) should be incompatible (i.e., immiscible) with the silane-functionalized polymer (i). This is in contrast to prior art systems that either rely on a radical grafting process or cover blends of silane copolymer with crystalline polyethylenes which are mutually compatible. The inventors speculate that the incompatibility of the silane copolymer and the polyolefin elastomer allows the silane copolymer to still form a cross-linked network even in the presence of high (up to 40% or so) amounts of the elastomer. Consequently, the final blend has excellent cure performance, mechanicals and flexibility.

The cross-linkable polyolefin composition may contain other components/additives typical for such resins, for example, antioxidants (e.g., hindered phenols such as, for example, IRGANOX™ 1010 a registered trademark of CibaSpecialty Chemicals), phosphites (e.g., IRGAFOS™ 168 a registered trademark of CibaSpecialty Chemicals), UV stabilizers, cling additives, light stabilizers (such as hindered amines), plasticizers (such as dioctylphthalate or epoxidized soy bean oil), thermal stabilizers, mold release agents, tackifiers (such as hydrocarbon tackifiers), waxes (such as polyethylene waxes), processing aids (such as oils, organic acids such as stearic acid, metal salts of organic acids), and colorants or pigments to the extent that they do not interfere with desired physical or mechanical properties of the compositions of the present invention.

The composition of the invention can be made by simply dry blending or melt blending the individual components and additives. For convenience, certain of the ingredients may be premixed, such as by melt processing, into master batches.

Such master batches are useful in aiding uniform dispersion of the ingredients and minimizing the number of components that need to be blended at the end-user's facilities.

Compounding, or melt blending, may take place in the extruder, calenderer, or other kind of forming equipment that melt mixes and makes the film or sheet, this is sometimes referred to as in-line compounding. Alternatively, the extrudable cross-linkable polyolefin composition of the present invention may be melt blended by conventional extrusion, in which a compound (generally in the form of a pellet) with or without additives, is obtained. The resulting compound (or pellet) is then extruded into a film or sheet. Additives may be added to the compounding process neat, in other word in their standard state (i.e., as liquid and/or powders), as concentrates, and/or master batches.

The extrudable cross-linkable polyolefin compositions of the present invention are processed into films and/or sheets or into one or more layers of a multilayered sheet structure by know processes, such as calendaring, casting, or most preferably (co-) extrusion processes. An extruded sheet has a first surface and a second surface. As per convention, but not limited by, the extrusion of a sheet is taken to be horizontally extruded (the direction of extrusion is orthogonal to the direction of gravity). Using such convention, the sheet's top surface is that farthest from the ground and the sheet's bottom surface is that closest to the ground, with the height of the sheet (thickness) being orthogonal to the ground when being extruded.

The sheet comprising the extrudable cross-linkable polyolefin composition of the present invention preferably has a thickness equal to or greater than 0.2 mm, more preferably equal to or greater than 0.3 mm, and even more preferably equal to or greater than 0.5 mm. The sheet preferably has a thickness equal to or less than 2.0 mm, more preferably equal to or less than 1.5 mm, and even more preferably equal to or less than 1 mm.

The extrudable cross-linkable composition of the present invention may be co-extruded with one or more layers comprising one or more plastic composition. In a preferred embodiment, the extrudable cross-linkable composition of the present invention is co-extruded with a polyurethane foam. Once formed, this embodiment provides a formed textured skin comprising an extrudable cross-linkable composition with a foam backing.

In one embodiment of the present invention, the sheet is then formed by a thermoforming or preferably by a vacuum forming process into a textured skin of the present invention. Either a negative forming process (sometimes referred to as "female" forming) or preferably a positive forming (sometimes referred to as "male" forming), is suitable to form the desired shape for the textured skin. The textured skin has an inside surface and an outside surface, sometimes the outside surface is referred to as the appearance surface.

In a positive forming process, the surface of the mold which imparts the shape into the sheet to produce the textured skin contacts the surface of the sheet which will become the inside surface of the formed skin.

In a negative forming process, the surface of the mold which imparts the shape into the sheet to produce the textured skin contacts the surface of the sheet which will become the outside or appearance surface of the formed skin.

Forming is preferably performed at a temperature equal to or less than 160° C., more preferably equal to or less than 155° C., and more preferably equal to or less than 150° C. Forming is preferably performed at a temperature equal to or greater than 120° C., more preferably equal to or greater than 125° C., and more preferably equal to or greater than 130° C. A preferred target temperature for forming a sheet comprising the extrudable cross-linkable polyolefin composition of the present invention is 140° C.

The textured skin of the present invention comprises a texture or "grained" appearance. The step which imparts texture may happen at the same time the extrudable cross-linkable polyolefin composition is extruded, alternatively, it may be a different step at a time after the composition is extruded into a sheet, but prior to forming into a skin, or texture may be imparted during the step of forming the sheet into a textured skin.

For example, one method of manufacturing such a textured skin is to first extrude an embossed sheet, i.e., a sheet with a textured or grained appearance on at least one surface, typically the top surface, but depending on the process and equipment arrangement it could be the bottom surface, or both. The extruded sheet passes through a roll gap between two rolls, wherein one roll comprises a negative texture which is imparted to one surface of the sheet as it contacts the rolls.

Sometimes the textured surface is referred to as the first surface of the sheet and the non-textured surface is referred to as the second surface of the sheet. Alternatively, the textured surface may be referred to as the second surface of the sheet and the non-textured surface may be referred to as the first surface of the sheet. The texturing step may be done in the same (on-line) or different (off-line) step as making the sheet. Any suitable method for off-line texturing may be employed, for example, embossing or stamping.

In one embodiment of the present invention, a textured sheet having texture on one surface is used to produce the textured skin of the present invention via a positive forming process. The sheet is orientated prior to forming so that the texture in the formed textured skin is on the outside (or appearance surface) of the textured skin. In other words, the non-textured surface of the sheet contacts the mold surface in a positive forming process during the forming step such that the texture on the surface of the sheet is on the outside surface of the formed textured skin.

In another embodiment of the present invention, a sheet having no texture, sometimes referred to as a non-textured sheet, may be formed into a textured skin of the present invention by negative forming process whereby a textured mold is used in the forming step to impart the texture into the sheet as it is formed into a textured skin.

In yet another embodiment of the present invention, a press with a male and a female mold half may be used to form the formed textured skin of the present invention wherein a non-textured or textured sheet may be used. In the case of a non-textured sheet, the female mold half is textured so as to impart texture into the formed textured skin.

Moisture cure of the cross-linkable polyolefin composition of the present invention begins once the composition is extruded into a sheet. Curing may be done by exposure to air (ambient cure) or any other convenient means. In one embodiment of the process of the present invention, the cross-linkable polyolefin composition is extruded and embossed into a textured sheet. Exposure to air subsequent to embossing is a preferred method to induce moisture cure. In other preferred embodiments, cross-linking subsequent to embossing may be accelerated, i.e., to improve retention of the texture, by spraying the textured sheet with water, hot water, or by exposing the textured sheet to steam, as the textured sheet exits the embossing rolls or at a later time thereafter, but prior to vacuum forming for example in a steam chamber, a continuous steam vulcanization tunnel, a hot water sauna, or the like.

In another embodiment of the process of the present invention, curing of the cross-linkable composition once the extruded sheet is formed into a textured skin may be accomplished by ambient cure or accelerated. In yet another embodiment, to improve retention of the texture, the formed skin may be spraying with water, hot water, or by exposing the formed skin to steam, for example in a steam chamber, a continuous steam vulcanization tunnel, a hot water sauna, or the like.

The textured skins according to the present invention are useful as covering materials in products in the following various fields: (i) in the automobile fields, for example, various automobile parts including interior cover materials of, for example, instrument panels, console boxes, arm rests, head rests, door trims, rear panels, pillar trims, sun visors, trunk room trims, trunk lid trims, air bag covers, seat buckles, head liners, gloves boxes and steering wheel covers; interior molded articles of, for example, kicking plates and change lever boots; exterior parts of, for example, spoilers, side moles, number plate housings, mirror housings, air dam skirt and mud guards; and other molded articles of automobile parts; (ii) in the sport good fields, decorative parts of sport shoes, grips of rackets, sport tools and goods of various ball games, covering materials of saddles and handlebar grips of bicycles, motor-cycles and tricycles, etc.; (iii) in the housing and building fields, covering materials of furniture, desks, chairs, etc.; covering materials of gates, doors, fences, etc.; wall decorative materials; covering materials of curtain walls; indoor flooring materials of kitchens, wash rooms, toilets, etc; outdoor flooring materials such as verandas, terraces, balconies, carports, etc.; carpets such as front door or entrance mats, table cloths, coasters, ash tray doilies; (iv) in the industrial part field, grips and hoses for electric tools, etc., and the covering materials thereof; packing materials; and (v) in other fields, covering materials of bags, briefcases, cases, files, pocket books, albums, stationary, camera bodies, dolls and the other toys, and molded articles such as watch bands, outer frames of picture or photograph and their covering materials.

One or more top coat may be applied to the formed textured skin, for example a coating to improve its scratch and mar resistance, for example TPU spray or lacquer.

EXAMPLES

Examples 1 to 3 and Comparative Examples A to E comprise a silane cross-linkable polyolefin polymer, an elastomer, and a cure catalysis with the compositions shown in Table 1. In Table 1:

"DFDB NT 5451 SI-LINK™" is a cross-linkable ethylene-vinyl trimethyl silane copolymer having a melt index of 1.5 grams per 10 minutes (g/10 min) at 190° C. and under a load of 2.16 kilogram (kg) and a density of 0.920 grams per cubic centimeter (g/cm$^3$) and is available from The Dow Chemical Company;

"DFDA 5488 NT" is an ambient or accelerated cure natural low density polyethylene (LDPE) catalyst masterbatch for cross-linking curable polymers available from The Dow Chemical Company;

"ENGAGE 8100" is a substantially linear ethylene-octene copolymer elastomer with a melt index of 1 g/10 min at 190° C. and under a load of 2.16 kg and a density of 0.870 g/cm$^3$ available from The Dow Chemical Company;

"ENGAGE 7256" is a substantially linear ethylene-octene copolymer elastomer with a melt index of 2 g/10 min at 190° C. and under a load of 2.16 kg and a density of 0.885 g/cm$^3$ available from The Dow Chemical Company; and "LDPE 400E" is a low density polyethylene polymer with a melt index of 1 g/10 min at 190° C. and under a load of 2.16 kg and a density of 0.925 and is available from The Dow Chemical Company.

The samples are prepared by using a small internal mixer to blend the three components at 160° C. for a total of 10 minutes. The blended composites are then immediately pressed into 2 millimeter (mm) thick plates for hot set performance and 1 mm plates for mechanical property and grain retention testing.

Curing and curing rate procedure: The plate is placed immediately in a water bath at 60 C and cure time noted. Hot set performance is determined according to IEC publication 540 clause 14 and British Standard 6469 section 3.3 at 200° C. with 0.2 mega Pascal (MPa) weight as per specification is measured as a function of cure time in the water bath. A hot set pass requires that the sample does not break or exceed elongation requirement of 175 percent at 200° C. for 15 minutes, time to 175 percent elongation and end point in percent are reported. In addition, on a fully cured sample (i.e., when the hot set is at the minimum) the following properties are determined and reported in Table 1:

"Tensile Strength and Elongation" are determined on a Zwick Z010 testing machine according to ISO 527 using 5A samples;

"Flexural Modulus" is determined on a Zwick Z010 testing machine according to ISO 178 at a test speed of 1 mm/min; and "Shrinkage" is determined on 1 mm plates, the original plate length and the plate length after cold relax are measured and the shrinkage is reported in percent (%) and is =(cold relax length-original length)/original length×100.

TABLE 1

|  | Example | | | Comparative Example | | | | |
| --- | --- | --- | --- | --- | --- | --- | --- | --- |
|  | 1 | 2 | 3 | A | B | C | D | E |
| COMPOSITION |  |  |  |  |  |  |  |  |
| DFDB 5451 NT | 66.5 | 70.5 | 66.5 | 95 |  | 36.5 | 96.5 |  |
| DFDA 5488 NT | 3.5 | 3.5 | 3.5 | 5 | 3.5 | 3.5 | 3.5 |  |
| ENGAGE 7256 | 30 |  |  |  |  |  |  |  |
| ENGAGE 8100 |  | 26 | 30 |  | 30 | 60 |  | 100 |
| LDPE 400E |  |  |  |  | 66.5 |  |  |  |
| PROPERTIES |  |  |  |  |  |  |  |  |
| Hot Set Time to 175% elong., hr | 3.4 | 3.1 | 3.3 | 2 |  |  |  |  |
| Hot Set End Point, % | 85 | 76 | 100 | 30 |  |  | 34 |  |
| Tensile Strength, MPa | 18.3 | 18.1 | 18 | 19.3 | 14.1 | 14.9 | 18.8 | 14.2 |
| Tensile Elongation, % | 440 |  |  | 340 |  |  |  |  |

TABLE 1-continued

|  | Example | | | Comparative Example | | | | |
| --- | --- | --- | --- | --- | --- | --- | --- | --- |
|  | 1 | 2 | 3 | A | B | C | D | E |
| Flexural Modulus, MPa | 120 | 118 | 94 | 190 | 170 | 50 | 175 | 9 |
| Shrinkage, % |  | 3 | 6 |  |  |  | 0.2 |  |

Examples 2 and 3 and Comparative Examples D and E are vacuum formed over a funnel shaped cone. The test is set up to allow a qualitative comparison of the thermoformability and grain retention of the samples. In this test each compression molded plate is clamped in a metal frame is heated at 140° C. in an oven for 10 min, then placed on top of the vacuum funnel and the sheet is thermoformed into the shape of a cone (funnel) at pressure of 0.4 Bar. Whether the sample plate ruptures and, if not, how well it takes the shape and grain of the funnel mold is recorded and the results are recorded in Table 2.

TABLE 2

| Example | Comparative Example | Grain Retention | Moldability/ Cone Breakage | Thermoforming Rating |
| --- | --- | --- | --- | --- |
| 2 |  | 9 | 9 | 18 |
| 3 |  | 7 | 9 | 16 |
|  | D | 3 | 7 | 10 |
|  | E |  | 1 | 1 |

Each sample is given a qualitative rating 1 (unacceptable), 3 (poor), 7 (acceptable), and 10 (good) for each of grain retention and the Thermoformability Rating is the sum of both ratings. Comparative Example D did not fully mold the cone shape due to extensive cross-linking. Comparative Example E ruptured. Examples 2 and 3 thermoformed well and showed acceptable to good grain retention.

What is claimed is:

1. A process to form a cross-linkable polyolefin composition into a textured skin comprising the steps of:
    a forming an extrudable cross-linkable polyolefin composition consisting of:
        i an amount of from 60 to 75 weight percent of one or more silane cross-linkable polyolefin polymer, weight percent based on the total weight of the cross-linkable polyolefin composition;
        ii a moisture-cure condensation catalyst;
        and
        iii an amount of from 25 to 40 weight percent of one or more polyolefin polymer elastomer, weight percent based on the total weight of the cross-linkable polyolefin composition, wherein the polyolefin polymer elastomer resin has a density of less than or equal to about 0.89 $g/cm^3$ and a melt index, $I_2$, of less than about 50 g/10 min and which has been prepared using at least one metallocene catalyst, wherein said melt index is as measured according to ASTM D-1238, Condition 190° C./2.16 kg;
    b extruding said extrudable cross-linkable polyolefin composition into a sheet comprising the cross-linkable composition, said sheet having a first surface and a second surface;
    c imparting a texture into the first surface of the sheet prior to or during step d;
    and
    d thermoforming or vacuum forming the sheet into a textured skin comprising a cross-linkable composition, said skin having an inside surface and an outside surface (or appearance surface) such that the textured surface of the textured sheet is the appearance surface of the textured skin.

2. The process of claim 1 wherein the silane cross-linkable polyolefin polymer is a copolymer of ethylene with a vinyl silane comonomer.

3. The process of claim 1 wherein the silane cross-linkable polyolefin polymer is a copolymer of ethylene-vinyltrimethoxysilane.

4. The process of claim 1 wherein the polyolefin polymer elastomer has a density of equal to or less than 0.885 $g/cm^3$.

5. The process of claim 1 wherein the polyolefin polymer elastomer resin has a melt index, $I_2$, of between about 1 to 40 g/10 min.

6. A thermoformed or vacuum formed textured skin made from a composition consisting of:
    a an extrudable cross-linkable polyolefin composition consisting of:
        i an amount of from 60 to 75 weight percent of one or more silane cross-linkable polyolefin polymer, weight percent based on the total weight of the cross-linkable polyolefin composition;
        ii a moisture-cure condensation catalyst;
        and
        iii an amount of from 25 to 40 weight percent of one or more polyolefin polymer elastomer, weight percent based on the total weight of the cross-linkable polyolefin composition, wherein the polyolefin polymer elastomer resin has a density of less than or equal to about 0.89 $g/cm^3$ and a melt index, $I_2$, of less than about 50 g/10 min and which has been prepared using at least one metallocene catalyst, wherein said melt index is as measured according to ASTM D-1238, Condition 190° C./2.16 kg.

7. The textured skin of claim 6 used as a covering material in an automotive product, a sporting goods product, a housing product, a building product, a furniture product, an industrial product, a bag, a briefcases, a toy, or an outer frame of picture or photograph.

8. The textured skin of claim 6 used as a covering material in an automobile product selected from an instrument panel, a console box, an arm rest, a head rest, a door trim, a rear panel, a pillar trim, a sun visor, a trunk room trim, a trunk lid trim, an air bag cover, a seat buckle, a head liner, a gloves box, a steering wheel, a kicking plate, a change lever boot, a spoiler, a side mole, a number plate housing, a mirror housing, an air dam skirt, or a mud guard.

* * * * *